Dec. 18, 1951     W. SCHMITZ     2,579,340
WINDING STEM WITH REMOVABLE CROWN
Filed Oct. 27, 1945     2 SHEETS—SHEET 1

Inventor,
Werner Schmitz
By
Young, Emery + Thompson
Attys.

Dec. 18, 1951 W. SCHMITZ 2,579,340
WINDING STEM WITH REMOVABLE CROWN
Filed Oct. 27, 1945 2 SHEETS—SHEET 2

Inventor,
Werner Schmitz
By
Young, Emery & Thompson
Attys.

Patented Dec. 18, 1951

2,579,340

UNITED STATES PATENT OFFICE 2,579,340

WINDING STEM WITH REMOVABLE CROWN

Werner Schmitz, Grenchen, Switzerland

Application October 27, 1945, Serial No. 625,042
In Switzerland November 28, 1944

8 Claims. (Cl. 58—90)

Watches having a case with cover present the inconvenience that the winding-stem makes the fitting of the movement into the case in some way troublesome. In order to avoid this inconvenience divided winding-stems are generally used, i. e. winding-stems made in two parts, one of which is part of the movement, the other of which is part of the winder. The two parts are coupled together axially after fixing the movement into the case.

The disadvantage in the use of such divided winding-stems is the necessity of providing for each type and size of case a stem of corresponding dimensions. Small differences in dimensions can influence the exactness of the coupling of the two parts of the stem and the tolerance allowed being extremely small, the number of sizes of divided stems is very large.

The purpose of the winding-stem with removable crown, which is the object of the present invention, is to avoid the necessity of the use of large numbers of divided stem of various sizes. To this end the stem is provided with an adjustable chuck which can be blocked in position by means of a conical grip in connection with the crown. The outer surface of the chuck will be preferably pyramid-shaped. The chuck will be screwed onto the winding-stem and grasped filmly by a correspondingly shaped grip pressing onto it either under the action of a nut with screw head screwed onto the extremity of the stem or else of a screw inserted in the inside thread of the chuck.

Preferably the said nut with screw head will be provided with a circular groove in the inside face of the head in such a manner as to leave a ledge which will fit loosely into a circular groove provided in the crown and which will compress a dust-proof washer.

The attached drawing represents, by way of example, two embodiments of a winding-stem with removable crown according to the present invention. Both types are dust-proof.

Figure 1:
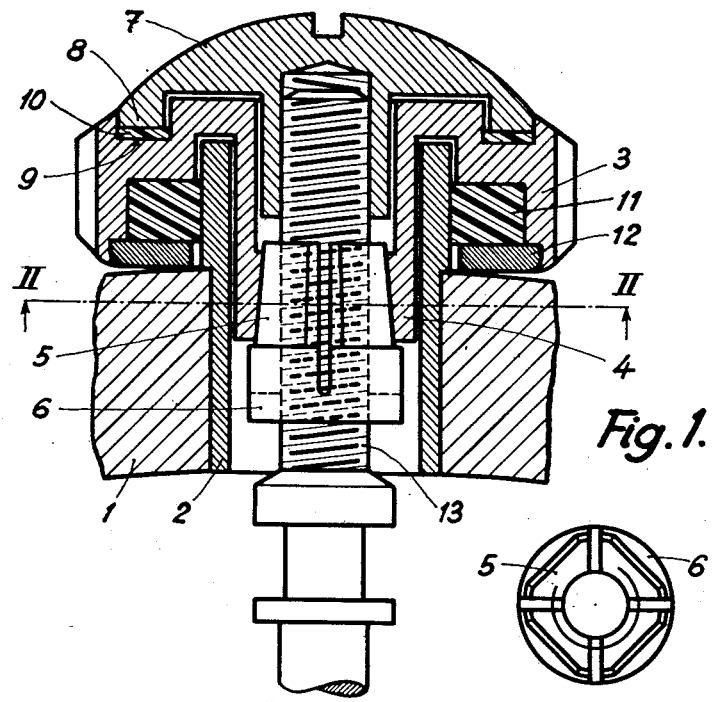
Figure 3:
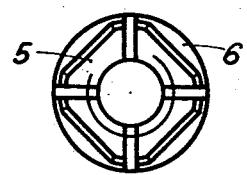
Figure 2:
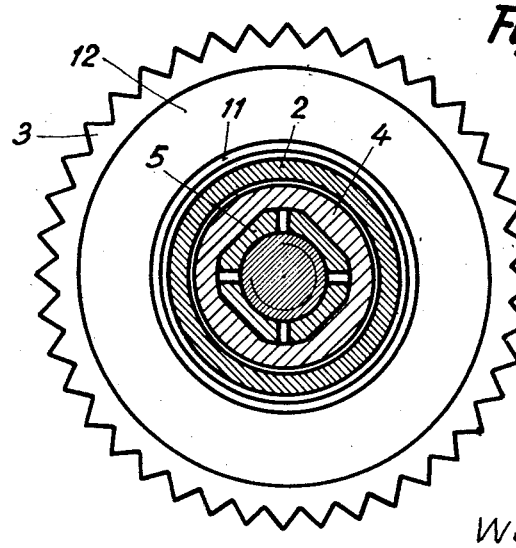
Figure 4:
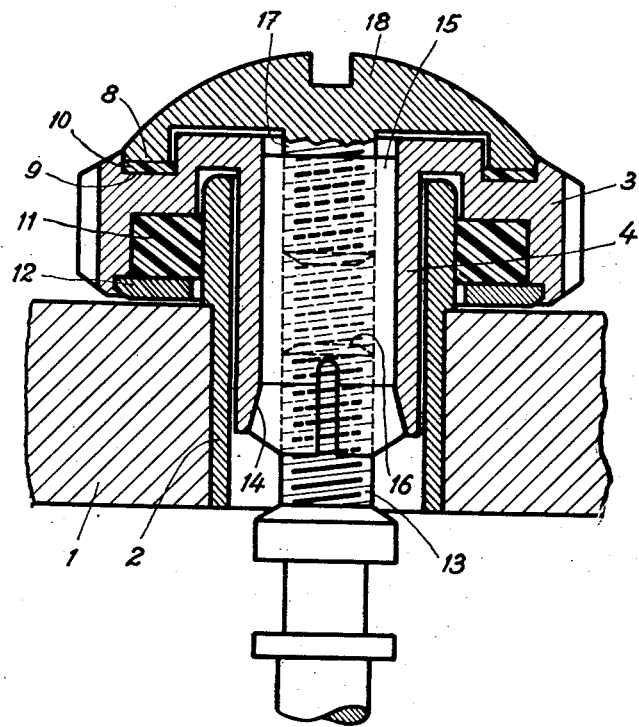

Fig. 1 is a longitudinal section;

Fig. 2, a section along the line II—II in Fig. 1;

Fig. 3, an elevation seen from the top of the chuck used in the winding shown;

Fig. 4 is a longitudinal section of the second embodiment.

In Figs. 1 to 3, the case-band is denoted by 1, into which is placed a sleeve 2 on the head of which the crown rides. The crown 3 is knurled at its outer circumference. The bottom part 4 of the crown forms a sleeve, the extremity of which is beveled so as to form a grip of a shape corresponding to the pyramid-formed nose with square base 5 of the chuck 6, the latter having an inner thread and which can be screwed on the upper end of the stem 13. The jaws of the chuck are slightly closed in a spring-like fashion so that it is possible to set the chuck 5 before assembly in its approximate position.

Before placing the nut with the screw head 7 on the threaded stem 13, the grip 4 of the crown 3 should be positioned on the chuck 5. Upon placing the nut 7 on the stem 13, the internally threaded sleeve-like portion passes between the stem and the bore in the top 3 of the crown. The said nut has a circular groove in its bottom or inside face leaving a circular ledge 8 which is designed to fit loosely into a concentric groove 9 in the top 3 of the crown, so that on tightening the nut a dust-proof washer 10 is compressed. Another dust-proof washer 11 is held in place in a concentric groove in the under-side of the top 3 of the crown by means of the washer 12. It is evident that the winding stem described is designed so as to permit quick and adequate adjustment of the chuck 5 on the stem according to requirements. The spring action of the jaws keeps them in place until the action of the grip locks them completely.

The shape of the gripping surface of the chuck could equally well be conical as pyramidal and the latter could easily have a base other than square. In the case of the cone-shaped chuck the tightening operation of the nut with screw head 7 would have to be quick and energetic owing to the fact that the grip must close tightly on the chuck whilst turning.

In the embodiment represented in Fig. 4, in which similar parts to those shown in the preceeding figures are denoted by the same reference numbers, the sleeve grip 4 of the lower part of the crown bears on the conical surface 14 of the chuck 15, the slot being, contrary to the preceding case, open at the bottom end. The chuck is comparatively long, much longer than the end of the stem 16. The shank 17 of the screw 18 is inserted in the upper end of the chuck. The ledge 8 of the screw head 7 compresses a dust-proof washer 10 in the concentric groove 9.

After having adjusted the chuck 15 on the stem 13, the former is locked by the grip sleeve 4 which bears on the cone 14 of the chuck under the action of the screw 18. This operation can be done very exactly and independently of factors which determine the operation, this on account of the fact that the chuck can be easily adapted to the circumstances.

What I claim is:

1. In a winding-up device for watches, a winding stem threaded on its outer end, a chuck with an internal thread and an inclined jaw surface, screwed to said outer end adjustably in longitudinal direction of said winding stem, a crown comprising, a member with a camming surface squeezing said chuck on said stem, and a screw screwed to said outer end and in cooperation with said member to press said camming surface against said inclined jaw surface.

2. In a winding-up device according to claim 1, said inclined jaw surface being pyramid-shaped.

3. In a winding-up device according to claim 1, said inclined jaw surface being cone-shaped.

4. In a winding-up device for watches, a winding stem threaded on its outer end, a chuck with an internal thread and an inclined jaw surface and a shank turned towards the outside of the watch, said chuck by its internal thread being screwed to said outer end adjustably in longitudinal direction of said winding stem, a crown comprising, a member with a camming surface squeezing said chuck on said winding stem, and a screw threaded to said internal thread and in cooperation with said member to press said camming surface against said inclined jaw surface.

5. In a winding-up device for watches, a winding stem threaded on its outer end, a chuck with an internal thread and an inclined jaw surface, screwed to said outer end adjustably in longitudinal direction of said winding stem, a crown comprising, a member with a groove in the top and a camming surface squeezing said chuck on said stem, a dust-proof washer placed in said groove, and a screw screwed to said outer end and having in the bottom a ledge in contact with said dust-proof washer to press said camming surface against said inclined jaw surface.

6. In a winding-up device for watches, a winding stem, a split chuck with an inclined jaw surface mounted on and adjustable along said winding stem, and a crown comprising two pieces, one piece having a camming surface in contact with said jaw surface, the other piece being adjustable with regard to the stem and in cooperation with said one piece to press said camming surface onto said jaw surface for locking said split chuck in adjusted position on said winding stem.

7. In a winding-up device for watches, a winding stem threaded on its outer end, an internally threaded chuck having an inclined jaw surface screwed to said outer end, said chuck being adjustable in a longitudinal direction to said winding stem, and a crown comprising two pieces, one piece having a camming surface in contact with said jaw surface, the other piece being adjustable with regard to said stem and in cooperation with said one piece to press said camming surface onto said jaw surface for locking said chuck in adjusted position on said stem.

8. In a winding-up device for watches, a winding stem, a split chuck with an inclined jaw surface mounted on and adjustable along said winding stem, a dust-proof washer, and a crown comprising two pieces, one piece having a groove in the top in which said washer is located and a camming surface in contact with said jaw surface, the other piece having a bottom ledge in contact with said dust proof washer and being adjustable with regard to said stem and in cooperation with said first piece to press said camming surface onto said jaw surface for locking said split chuck in adjusted position on said winding stem.

WERNER SCHMITZ.

REFERENCES CITED

The following references are of record in the file of this patent:

UNITED STATES PATENTS

| Number | Name | Date |
| --- | --- | --- |
| 579,848 | Thompson | Mar. 30, 1897 |
| 2,270,384 | Simon | Jan. 20, 1942 |

FOREIGN PATENTS

| Number | Country | Date |
| --- | --- | --- |
| 84,785 | Switzerland | Aug. 16, 1920 |
| 90,341 | Switzerland | Aug. 16, 1921 |
| 208,581 | Switzerland | May 16, 1940 |
| 524,723 | Great Britain | Aug. 13, 1940 |